United States Patent [19]
Reimold

[11] 3,822,041
[45] July 2, 1974

[54] MIXING SYSTEM FOR EXPANDING FOAM AND APPARATUS FOR APPLYING SAME

[75] Inventor: Dieter Reimold, Heddesheim, Germany

[73] Assignee: Firma Rheinhold & Mahla GmbH, Mannheim, Germany

[22] Filed: Feb. 5, 1973

[21] Appl. No.: 329,863

[30] Foreign Application Priority Data
Feb. 11, 1972 Germany .................... 7205125[U]

[52] U.S. Cl. ............................... 239/112, 239/414
[51] Int. Cl. ........................ B05b 15/02, B05b 7/12
[58] Field of Search .......... 239/113, 112, 414, 415, 239/407

[56] References Cited
UNITED STATES PATENTS

| | | |
|---|---|---|
| 948,323 | 2/1910 | Harris ............................... 239/414 |
| 2,438,462 | 3/1948 | Smith ............................... 239/415 |
| 3,229,911 | 1/1966 | Carlson et al. .................. 239/414 X |
| 3,232,585 | 2/1966 | Garbarino et al. ............... 239/415 |
| 3,330,484 | 7/1967 | Johnson et al. ................... 239/414 |
| 3,375,978 | 4/1968 | Rennie ............................. 239/113 |

Primary Examiner—Robert S. Ward, Jr.
Attorney, Agent, or Firm—McGlew and Tuttle

[57] ABSTRACT

A spray gun, for mixing expanded plastic foam using compressed air and discharging the foam-air mixture, has a gun body with a mixing chamber, inlet means for connection to a supply of expanded plastic foam, inlet means for connection to a compressed air supply and a mixture discharge line. The gun has valves mounted in the body controlling supply of the expanded plastic foam to the mixing chamber. A third inlet is provided for connection to a control line, for the pump or the like, and this control line contains air under pressure which, when released, interrupts operation of the foam supplying means. Another valve in the gun body is operable to release the air under pressure from the control line. The body carries an operating handle which is geared to operating members for the valves controlling the supply of plastic foam, so that the valves are operated conjointly, and further gearing interconnects these valves with the valve controlling release of air under pressure from the control line. Thereby, when the supply line to the gun is closed down, air is discharged from the control line responsive to movement of the operating member in a valve closing direction, and the release of air from the control line interrupts operation of the pump or the like. Preferably, the gearing interconnecting the several valves and the operating handle is provided so that the gearing and the control handle may be removed as a unit from the gun body for pre-adjustment of the several valves.

6 Claims, 4 Drawing Figures

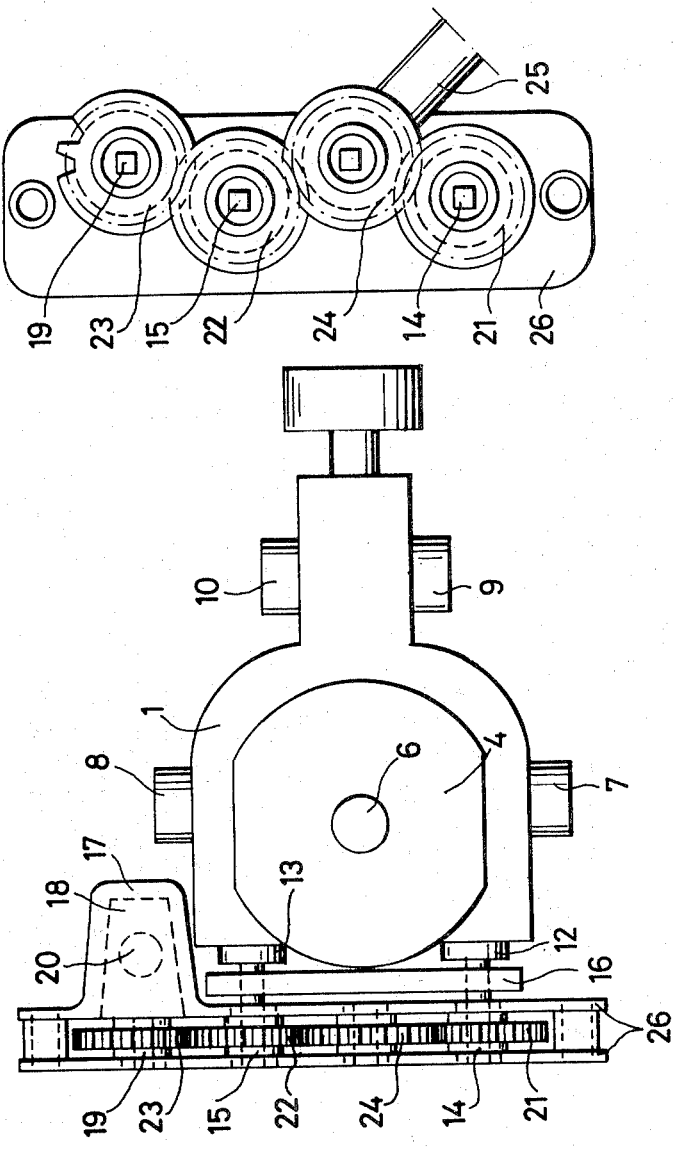

MIXING SYSTEM FOR EXPANDING FOAM AND APPARATUS FOR APPLYING SAME

BACKGROUND OF INVENTION

The present invention relates to a spraying system including a spray gun for expanded plastic foam. Such systems usually mix the compounds by mechanically driven stirring wings in the gun head and thus bring about a continuous cleaning with a suitable washing solvent requiring relatively frequent servicing. Furthermore there are well-known mixing systems for spray guns mixing the compounds by air turbulence.

The application of such mixing systems often raises problems whenever an interruption of the material discharge is required. Turning off the often very long material lines at the gun itself without influencing the material pump results in building up of a high pressure within the lines, which can entail the bursting of the lines or their breaking off the connecting sockets. Each new start of the gun results in a poor mixing of the first shot of discharge material due to the high ramming pressure of the material in the lines.

Therefore, the supply pump itself is turned off during each interruption and/or shut off of the material discharge. In all known systems this is achieved by an electric impulse triggered at the gun. This proves to be a great disadvantage especially under working conditions where frequently any forming of sparks is highly dangerous.

SUMMARY OF THE INVENTION

It is the object of the present invention to provide a mixing system in a spray gun where it is possible, during interruptions of the spraying process, to turn off the supply device without any formation of sparks.

According to the present invention the mixing system comprises a device for controlling the supply assembly consisting of an air control valve mechanically connected to the control member of the material supply line, this valve being connected to the corresponding switching member of the discharge assembly by means of an air pressure line, the air control valve as well as the control members having preferably the form of a cone valve.

For still better operation, the valves for the supply line and the compressed-air control may be frictionally connected to each other by means of power transmitting gear adjusted on the valve shafts, the power transmitting gear of the control member for the material supply line having preferably an additional power transmitting gear connected to an operating handle. It is advantageous to use cogwheels for the power transmitting gear.

In a preferred arrangement, the power transmitting gear can be adjusted in a frame which is detachable from the valve shafts of the cone valves.

The principal object of the present invention is to provide an improved method of spraying expanded plastic foam compounds from a spray gun while turning off the supply line without risking the formation of sparks as is the case with operating electric contact mechanisms. Such a procedure is required especially when using the mixing system in ship yards. The compressed air required for mixing the compounds is conveniently available in most workshops from existing compressed-air lines.

BRIEF DESCRIPTION OF THE DRAWINGS

The invention will be more fully understood and further objects and advantages thereof will become apparent when reference is made to the following detailed description of a preferred embodiment of the invention and the accompanying drawings in which:

FIG. 2 is an end elevation view of a spray gun;
FIG. 3 is a plan view of the location of the power transmitting gear.

DESCRIPTION OF THE PREFERRED EMBODIMENT

Figure 1:
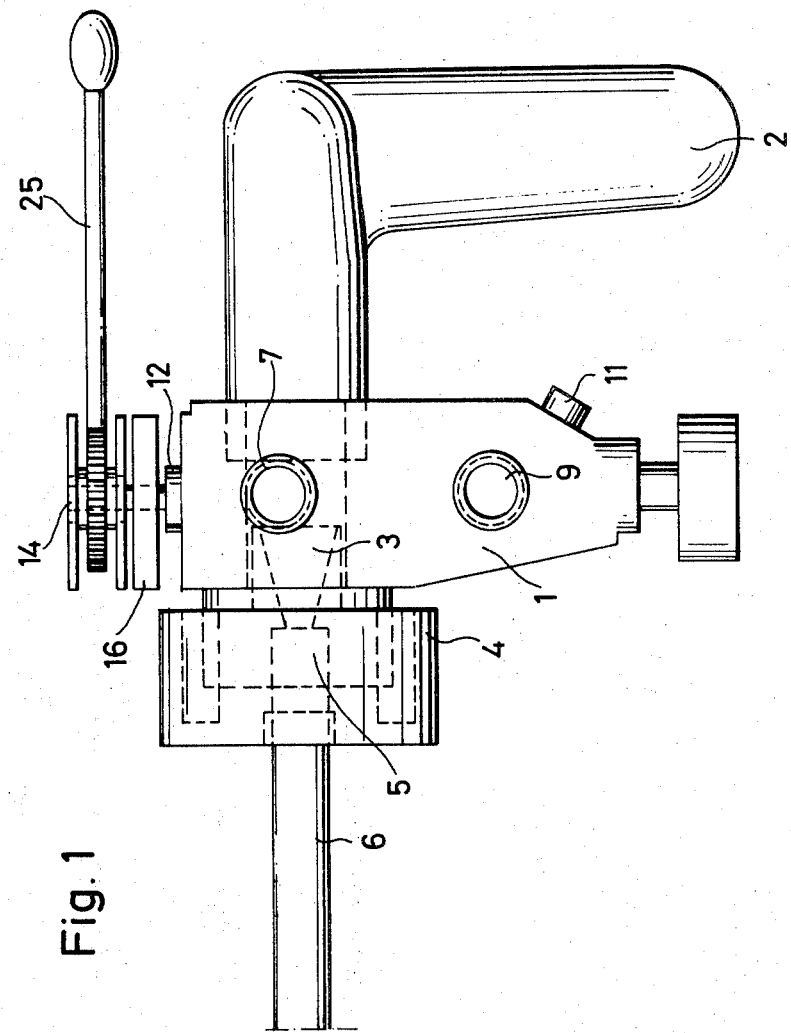
FIG. 1 is a side elevation view of a spray gun.
Figure 4:
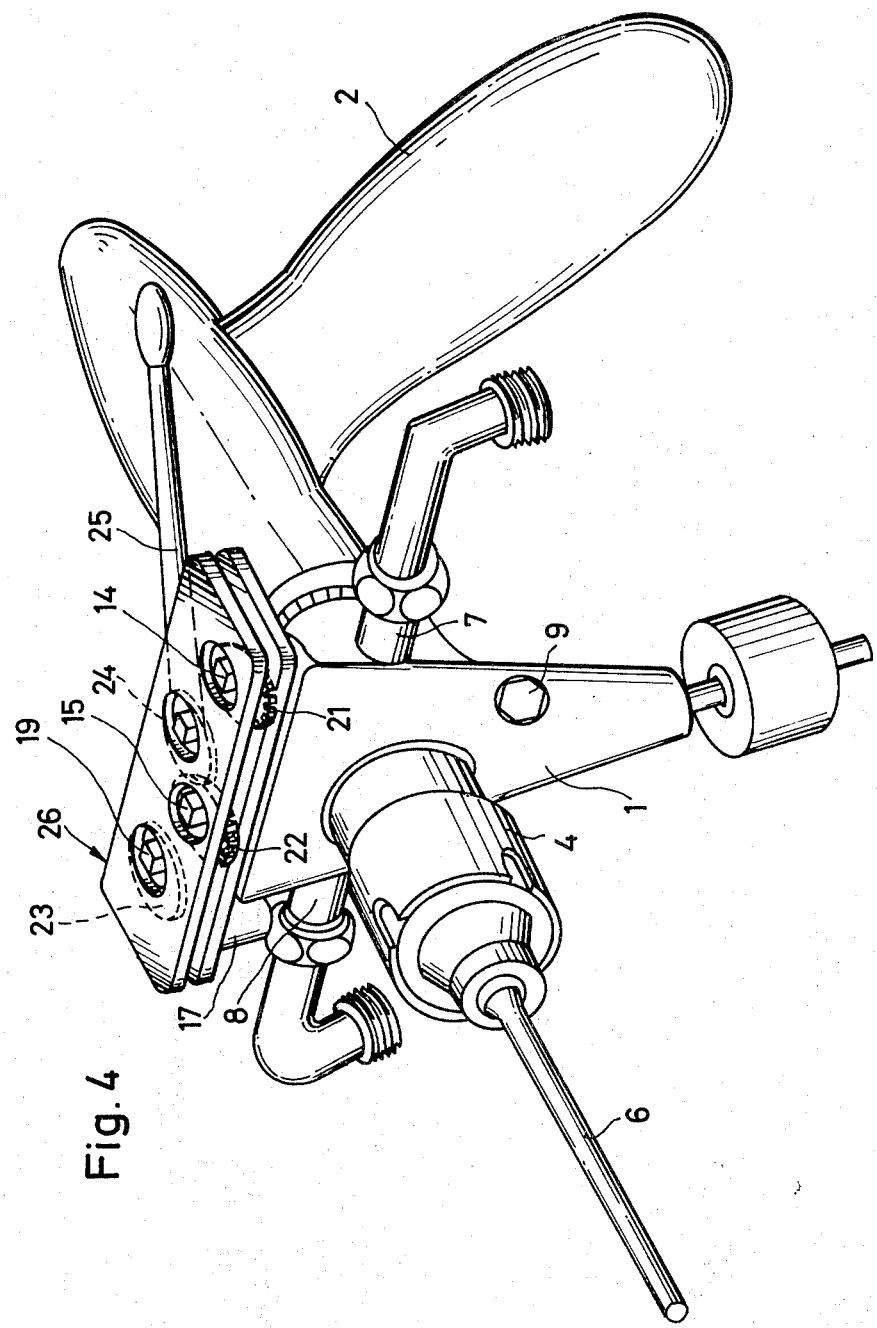
FIG. 4 is a perspective view of the spray gun shown in FIGS. 1, 2 and 3.

Referring to the drawings there is illustrated a spray gun consisting of a casing 1 having, on its back side a handle 2, and, on its front side, a member 4, member 4 extending with a cone shaped mixing chamber 3 into casing 1. The mixing chamber 3 is connected to the discharge line 6 by means of a bore 5. On the side, the casing 1 has apertures 7, 8 on a level with the mixing chamber 3, for material supply.

For the so called froth-foam-system there is, in the lower part on one side, an aperture 9 for supply of a third compound and, on the opposite side, an aperture 10 for the supply of a washing solvent, the washing solvent being used for cleaning mixing chamber 3 and the discharge opening after the froth-foam-process during which a viscous pre-expanded foam is formed.

In the lower part of the casing 1 is a supply line 11 for compressed air necessary for mixing the compound and cleaning the mixing chamber and the discharge opening. Cone valves 12, 13 are located in the upper part of the casing 1 and extend into said casing for closing and opening the apertures 7, 8. The cone valves 12, 13 have stub shafts 14, 15 and are held in their location by a plate 16. The frame 26 has, on one side a protuberance 17 receiving an additional cone valve 18, valve 18 being inserted into the protuberance with its axis parallel to those of cone valves 12, 13. Cone valve 18 also has a stub shaft 19 and closes and/or opens a compressed-air line connected at 20. The cogwheel 23 is adjusted to the stub shaft 19 to mesh with the nearest cogwheel 22.

Cogwheels 21, 22 meshing together are located on the stub shafts 14, 15. Interposed between the cogwheels 21, 22 is an additional cogwheel 24 having an operating handle 25, the cogwheels 21, 22 being connected to the control valves 12, 13. All cogwheels 21, 22, 24 are combined in a frame 26 which is detachable, together with the cogwheels, for securing the preferred setting of the valves and the unauthorized operating of the gun.

If the spraying process is to be interrupted the operating handle 25 and — by means of the cogwheel 24 — the cogwheels 21, 22 and simultaneously the cone valves 12, 13 are turned thus closing the material supply line. Simultaneously the cogwheel 23 is turned by means of the cogwheel 22 thus opening the cone valve 18. This enables the release of compressed air from the compressed-air line 20 which is connected to the cone valve 18, thus diminishing the air pressure existing in line 20 and simultaneously activating a valve turning off the material discharge pump. The reverse action comprises opening of the material supply line by means of the cone valves 12, 13 and simultaneously closing the cone valve 18, thus building up an air pressure in the line 20, the air pressure activating the control valve connected to the material discharge pump and causing discharge.

What is claimed is:

1. A spray gun, for mixing expanded plastic foam using compressed air and discharging the foam-air mixture, comprising, in combination, a gun body including means defining a mixing chamber, first inlet means for connection to means supplying expanded plastic foam, second inlet means for connection to means supplying compressed air and communicating with said mixing chamber, and a mixture discharge line connected to said mixing chamber; valve means in said body controlling connection of said first inlet means to said mixing chamber; a third inlet means, for connection to a supply control line containing air under pressure which, when released, interrupts operation of said supplying means; an air control valve in said body operable to release the air under pressure from said control line; and means interconnecting said valve means and said air control valve and operable, responsive to closing of said valve means, to open said air control valve to interrupt operation of said supplying means.

2. A spray gun, as claimed in claim 1, wherein said valve means and said air control valve comprise cone valves.

3. A spray gun, as claimed in claim 2, wherein said cone valves have operating shafts; said means interconnecting said valve means comprising power transmitting gears adjustably mounted on said valve shafts.

4. A spray gun, as claimed in claim 2, including a further power transmitting gear connected to an operating handle and meshing with the power transmitting gears operating the cone valves constituting said valve means.

5. A spray gun, as claimed in claim 3, in which said power transmitting gears are cog wheels.

6. A spray gun, as claimed in claim 3, in which said power transmitting gears are rotatably mounted in a frame; said frame, with said power transmitting gears, being removable from said valve shafts as a unit.

* * * * *